US012614776B2

(12) United States Patent
Cassarino et al.

(10) Patent No.: US 12,614,776 B2
(45) Date of Patent: Apr. 28, 2026

(54) METHOD FOR PREHEATING A SWITCHABLE BATTERY DEVICE

(71) Applicant: COMMISSARIAT A L'ENERGIE ATOMIQUE ET AUX ENERGIES ALTERNATIVES, Paris (FR)

(72) Inventors: Leandro Cassarino, Grenoble (FR); Sylvain Bacquet, Grenoble (FR); Ghislain Despesse, Grenoble (FR); Eric Fernandez, Grenoble (FR); Yan Lopez, Grenoble (FR); Remy Thomas, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 649 days.

(21) Appl. No.: 18/145,172

(22) Filed: Dec. 22, 2022

(65) Prior Publication Data

US 2023/0207920 A1      Jun. 29, 2023

(30) Foreign Application Priority Data

Dec. 23, 2021    (FR) ..................................... 21 14455

(51) Int. Cl.
*H01M 10/633* (2014.01)
*H01M 10/42* (2006.01)
(Continued)

(52) U.S. Cl.
CPC ..... *H01M 10/633* (2015.04); *H01M 10/4264* (2013.01); *H01M 10/486* (2013.01);
(Continued)

(58) Field of Classification Search
None
See application file for complete search history.

(56) References Cited

U.S. PATENT DOCUMENTS 6,340,879 B1    1/2002  Bläcker
2007/0160900 A1*  7/2007  Nollet ................... H02J 7/0063
                                             320/136
(Continued)

FOREIGN PATENT DOCUMENTS

FR        3 007 210 A1    12/2014

OTHER PUBLICATIONS

French Preliminary Search Report and Written Opinion issued Nov. 16, 2022 in French Application 21 14455 filed on Dec. 23, 2021 (with English Translation of Categories of Cited Documents), 10 pages.

*Primary Examiner* — Scott J. Chmielecki
(74) *Attorney, Agent, or Firm* — Oblon, McClelland, Maier & Neustadt, L.L.P.

(57)        ABSTRACT

The invention relates to a battery pack type device including a first terminal (101), a second terminal (102) and a plurality of energy storage elements between these terminals, each element including:
   a) at least one switch for connecting it with, or to disconnect it from, one or more other element(s);
   b) at least one conductor (15, 17) for conducting a current, parallel to the element, when the latter is not connected with one or more other element(s);
   c) at least one switch (20) for establishing a short-circuit between the terminals of the battery when the latter is disconnected or supplies a zero voltage;
   d) a control circuit (30), specifically adapted to:
   select at least one first energy storage element and at least one second energy storage element, at least one of these elements being to be heated up, to make a current circulate at least from the first element to the second element when the terminals (101, 102) are short-circuited;

(Continued)

stop the current when a setpoint temperature for one or more element(s) of the pack is reached.

19 Claims, 6 Drawing Sheets

(51) Int. Cl.

| | |
|---|---|
| *H01M 10/48* | (2006.01) |
| *H01M 10/615* | (2014.01) |
| *H01M 10/617* | (2014.01) |
| *H01M 50/581* | (2021.01) |

(52) U.S. Cl.
CPC ....... *H01M 10/615* (2015.04); *H01M 10/617* (2015.04); *H01M 50/581* (2021.01)

(56) References Cited

U.S. PATENT DOCUMENTS

| | | | |
|---|---|---|---|
| 2008/0090111 A1 | 4/2008 | Kim et al. | |
| 2014/0015488 A1* | 1/2014 | Despesse ............ | H01M 10/441 |
| | | | 429/7 |
| 2016/0141734 A1 | 5/2016 | Bui Van et al. | |
| 2019/0299799 A1* | 10/2019 | Hinterberger ........... | B60L 50/64 |
| 2020/0321668 A1* | 10/2020 | Xiong .................. | H05B 3/0014 |
| 2021/0328272 A1* | 10/2021 | Von Emden ........ | H01M 10/486 |

* cited by examiner

METHOD FOR PREHEATING A SWITCHABLE BATTERY DEVICE

TECHNICAL FIELD AND PRIOR ART

The invention relates to the field of switchable battery devices. More particularly, it relates to a device and a method which allows carrying out a heating of one or more element(s) of a switchable battery device, in particular when the output of the latter is short-circuited.

An architecture of a device with switchable batteries or cells is known for example from the following documents: FR2972305 and FR3007210. Other documents such as FR2972307, FR2977986, FR2951320, FR2944161 also describe architectures of a device with switchable batteries or cells.

In the documents FR2972305 and FR3007210, the output/exchange current is directly related to the output current $I_{out}$ of the pack that supplies the application or which originates from a charger. This current is controlled to meet the needs of the application and is not optimised for heating the elements, even though one might prefer the use of one element rather than another one to heat one element in priority with respect to another one; yet, at the same time, this element is discharged more substantially in comparison with the others. Furthermore, upon shut-down of the system, it is impossible to achieve a pre-heating of the battery pack since there is no current $I_{out}$ exchanged with the outside.

In other words, if the output current is zero, the known documents, mentioned hereinabove, do not provide a solution allowing achieving heating of some elements of the battery pack.

Hence, the problem of being able to perform heating of the different elements of an architecture of a switchable-type battery "pack" arises, when the latter is disconnected from the load or supplies a zero voltage.

DISCLOSURE OF THE INVENTION

The objective of the invention is to be able to perform a heating of one or more element(s) of a battery pack when the latter is disconnected from the load or supplies it at a zero voltage.

The invention also provides a mechanism enabling a switchable battery device to heat one or more element(s) or one or more cell(s) even when the system is disconnected from the load or else if it supplies a zero voltage at the output.

To this end, the invention relates to a battery pack type device including a first terminal, a second terminal and a plurality of energy storage elements between said first element and said second terminal, each element may include:

a)—a plurality of energy storage cells in series, each associated with switch means for connecting it, for example in series, with at least one other element, or to disconnect it from one or more other element(s);

b) conductor means for conducting a current, called main current, parallel to the element, or via a parallel circuit or route (including at least one conductor) parallel to the element, called "bypass" circuit or route, when this element is disconnected or is not connected with one or more other element(s);

preferably, the device includes:

c)—means for establishing a short-circuit between a first terminal and a second terminal of the battery when the latter is disconnected or supplies a zero voltage;

d) control means, specifically adapted to select at least one first energy storage element, for example in a first state-of-charge, and at least one second energy storage element, for example in a second state-of-charge, at least one of these two elements being to be heated up and to make a current circulate from the first element to the second element when the first terminal and the second terminal of the device are short-circuited.

In the present application, a "bypassed" element is an element that is disconnected yet with means, forming for example a parallel or alternative circuit (which may include one or more conductor element(s), for example a transistor) or route, enabling the circulation of a current, called main current, in the battery; the current then flows through these means, for example through this route parallel or alternative to that of the element, for example through one or more parallel cell(s) which has/have remained connected or through one or more conductor element(s) which has/have remained connected to the flow route of said current; this parallel circuit or route conveys the current by closure of a means forming a power switch while a series power switch (or the switch means for connecting the element in series with at least one other element) of the element is open; a "bypass" route of an element can therefore be a circuit portion or an alternative route for the current of the battery or of the pack.

Preferably, the switch means (for example a power switch) associated to the element, for example in series with the latter, are opened before the parallel route is closed, for example by switch means (for example a power switch), which avoids any risk of short-circuiting the element; for this purpose, one could provide for a dead time between opening of the switch means associated with the power switch and closure of the parallel route.

The control means may further be specifically adapted to stop the current when at least one setpoint temperature for at least one or more cell(s) of the pack, for example at least one of the 2 cells hereinabove and/or for a portion of the battery pack and/or for the battery pack is reached and/or when at least 2 cells have substantially the same temperature or a neighbouring temperature. By neighbouring, or substantially the same temperature, or the same temperature, it should be understood a temperature discrepancy by less than 10° C., advantageously by less than 5° C.

The invention also relates to a method for heating or balancing the temperature of a battery pack type device of the above-described type.

The invention also relates to a method for heating or balancing temperature in a battery pack type device, for example as described hereinabove in the context of the present invention, including a first terminal, a second terminal and a plurality of energy storage elements, for example in series, between said first terminal and said second terminal, each associated with switch means to connect it to or disconnect it from one or more other element(s), this method including:

a) the establishment of a short-circuit between a first terminal and a second terminal of the battery pack when the latter is disconnected or supplies a zero voltage;

b) the selection of at least one first energy storage element, for example in a first state-of-charge, and at least one second energy storage element, for example in a second state-of-charge, at least one of these two elements should be heated up;

c) the circulation of a current between the first element and the second element.

The circulation of this current can be stopped when at least one setpoint temperature for at least one or more element(s) of the pack, for example at least one of the 2 elements hereinabove and/or for at least one portion of the battery pack and/or for at least the battery pack is reached and/or when at least 2 elements have the same temperature or a neighbouring temperature.

According to the invention, it is possible to close the electrical circuit (by short-circuiting the output of the battery pack) and make the current flow through the battery pack, which could then circulate in one or more element(s) and thus heat them.

Hence, it is possible to exchange current between the elements of the battery pack to heat up one or more of these elements.

The output of the back being short-circuited, the exchange current is controlled by the battery itself via a regulation loop of the current that flows in the short-circuit of the output, which has the following advantages:

independence with respect to the case of an output current that evolves according to the needs of the user;

it is possible to heat up the battery, before start-up of the system, i.e. without needing a charging current or a current consumed on equipment connected at the output of the battery pack.

It is possible to make a current flow back-and-forth between the cells or the elements, which, on average, does not significantly modify their state-of-charge: for example, one element gives in charges that it recovers afterwards, preferably at frequency that is high enough (for example a frequency >0.01 Hz) so that the state-of-charge of each element does not significantly oscillate. Yet, this back-and-forth current creates ohmic losses in the bricks (or elements), which heats them up. In a method according to the invention, the circulation of a current between the first element and the second element may include a current back-and-forth flow between these 2 elements, the current exchanged between these 2 elements being zero on average.

The current, for example the average root mean square current, of each element can be regulated so as to control the temperature of the considered element(s). The root mean square current corresponds to the root square of the squared average of the current. For a sinusoidal current, the root mean square value is equal to the peak amplitude divided by the square root of 2 and the average current is zero (i.e. the exchanged power is zero on average); it is possible to use current of different forms, as explained later on in the present application. This current may have a continuous component to ensure, at the same time, a power exchange function (for a readjustment, for example, of balancing, of availability, of efficiency inter alia).

According to the present invention, charge imbalances are intentionally created, by circulation of the charges between the elements of the pack, then it is possible to cancel these imbalances, by circulation of the charges in the reverse way, in order to heat up the elements or the cells. Preferably, charge imbalances that are created last a short time and in one way then in the other, in order to heat up one or more element(s).

The invention allows avoiding the implementation of a heating device, for example an electrical one, external to the battery pack (for example by an electrical heating device).

In addition, it allows bringing in heat to the core of the cells of the battery (where it is useful), and minimises peripheral losses.

Steps a)-c) can be implemented by control means of the battery pack.

A device according to the invention may include means allowing reversing the voltage of at least one element or group of elements (for example of a module); a method according to the invention may include a step of reversing the voltage of at least one element or group of elements (for example of a module). This allows directing a current from the element or from the group of element(s), whose voltage has been reversed, to another element or group of element(s).

In a device or a method according to the invention, each element may include one or more electrochemical cell(s) and/or one or more capacitance(s) and/or one or more supercapacitance(s) and/or one or more storage cell(s).

An element of a device or in a method according to the invention may include:

any set of elementary electrochemical cell(s) connected in series and/or in parallel, which is sometimes called "module";

and/or a cell including a generator element (photovoltaic for example, or fuel cell) associated for example with one or more storage element(s) (of the electrochemical or capacitance type).

The control means may be specially adapted, and/or a method according to the invention includes a step, to calculate at least the value and/or the profile of a heating current ($I_{out\_set\_eff}$) according to:

a temperature of one or more element(s) and/or an external temperature ($T°_{ext}$) and/or a state of the battery, for example a state-of-charge (SoC) and/or a state-of-heath (SoH);

and/or the capacity of the elements of the battery to accept a current;

and/or a duration estimated before the battery is used.

The control means may further be specially adapted to calculate one, and/or a method according to the invention may include a step of calculating one, heating current ($I_{out\_set\_eff}$) according to a waveform of the current.

According to one embodiment, the current has:

a continuous form or is constant;

or a periodic waveform, for example sinusoidal, or square-like, or triangular, to which a possible continuous component is superimposed, allowing for example achieving a readjustment, for example a balancing, of the state-of-charge between the cells or the elements; balancing of the state-of-charge is a particular case of the readjustment; one could seek to modify the relative states-of-charge without necessarily seeking balance but for example availability.

According to another embodiment:

the current has a continuous form or is constant;

the voltages supplied at least by the first energy storage cell and at least by the second energy storage cell, being alternating, and possibly including a continuous component.

In a method or a device according to the invention, the current may have a form optimised to maximise heat-up; for example, it has a frequency for which the real component of an impedance of at least one cell is maximum.

The control means may further be specially adapted to, and/or a method according to the invention includes a step of:

performing a distribution of the elements to be heated up into two groups of elements G1 and G2;

making the current circulate from the group G1 of elements to the group G2, then possibly from the group G2 of elements to the group G1.

The control means may further be specially adapted to, and/or a method according to the invention includes a step to, maximise the number of elements involved in the groups G1 and G2 and/or to maximise $|U_{G1}|+|U_{G2}|$, $U_{G1}$ (resp. $U_{G2}$) being the voltage supplied by the group G1 (resp. G2).

A device according to the invention may include a current regulation loop. In a method according to the invention, the current may be regulated using a regulation loop.

For example, said current regulation loop determines a number (NG1) of first energy storage elements and a number (NG2) of second energy storage elements, as well as the voltage (VG1) supplied by all of the first energy storage elements and the voltage (VG2) supplied by all of the second energy storage elements.

The following strategies can be implemented using a device or a method according to the invention:

different elements or portions of the battery pack can be heated to different temperatures;

or different elements or portions of the battery pack can be heated so as to make them converge to a common temperature, for example the temperature of the element or of the portion of the hottest pack;

or a method according to the invention or a heating of a device according to the invention can be preceded by cooling of different elements or portions of the battery pack to make them converge to a common temperature.

The invention may apply to all storage systems based on a switchable architecture, i.e. a battery or a set of batteries, composed by cells or elements, for example by modules, able to be set in series, or set in parallel, or replaced by a short-circuit or set in series with a possible reversal in the polarity. An "element" may be an elementary cell, for example an electrochemical cell, or a group of such elementary cells connected in series and/or in parallel. In general, the invention also applies to the cases where the elements are associated with DC/DC converters.

The invention can also apply to batteries including several accumulators of different technologies (for example different battery chemistries, capacitances, supercapacitances . . . ) and/or of different generator technologies (fuel cell, solar panels . . . ).

In the present application, a reference to one or more switchable cell(s) should be understood as also covering a combination of several electrochemical cells, and/or several capacitances, and/or several fuel cells, and/or several energy sources/generators . . . .

A combination of several cells that can be connected in series and/or in parallel is also called "module".

In general, in the present application, the state-of-health can be defined by the degradation of the amount of charge that a cell (or more generally an element) can store/deliver, in comparison with its original state (before any use), at equal current. A 100% SoH applies when there is no degradation, a 0% SoH means that the cell can no longer store energy. It is also possible to define the capacity ratio in Ah between the capacity of the cell (or more generally an element) at a time point t and its capacity when it was new. The capacity of a cell is the number of Amps-hour (Ah) (the Ah is a unit homogeneous with Coulomb) that the cell can deliver following a complete charging.

Amps-hours correspond to an integration of the current, for the capacity, this consists in integrating the current between the start and the end of discharge. One could also find a definition of the SoH in the following link: https://www.labellebatterie.com/soh-batterie-et-capacite-ce-quil-faut-comprendre/

6

BRIEF DESCRIPTION OF THE DRAWINGS

Embodiments of the invention will now be described with reference to the appended drawings wherein.

DETAILED DISCLOSURE OF PARTICULAR EMBODIMENTS

Figures 1, 2:
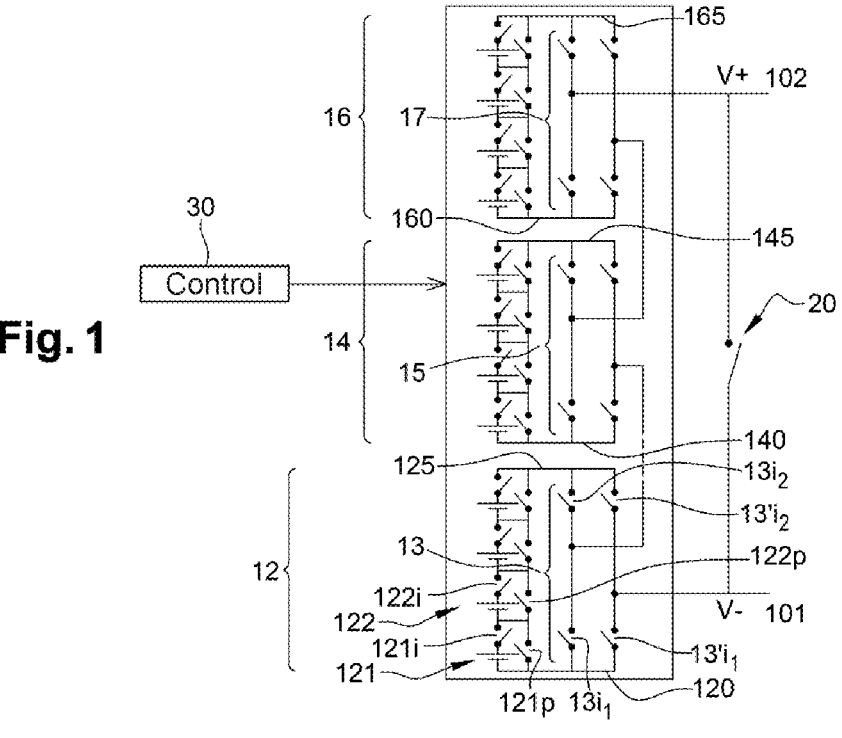
FIG. 1 represents an embodiment of a battery pack according to the invention, implementing an architecture with switchable elements, provided with means for short-circuiting its output.
FIG. 2 schematically represents an embodiment of the control means implemented in the context of a battery pack according to the invention.

FIG. 1 represents a battery pack with a switchable architecture, which can be implemented in the context of the present invention.

Such a pack may include M modules (Ei, ($1 \le i \le M$)) 12, 14, 16, each module including a plurality of N cells 121-124, 141-144, 161-164. In FIGS. 1, M=3 and N=4, but M may be any number (for example $1 \le M \le 1,000$) and/or the number N may also be any number (for example $1 \le N \le 1500$) for each module (for example, a module may include one single element); in addition, several modules may include several series of cells, these series being disposed in parallel to each other. Each module includes a 1st terminal 120, 140, 160 and a 2nd terminal 125, 145, 165.

This architecture with switchable cells allows:

regulating a charging current when it is connected to a direct or alternating voltage source, by adjusting the number of cells set in series in real-time;

and/or drawing on an AC network an AC current in phase with the mains voltage thanks to a synchronisation mechanism;

and/or ensuring mains services by drawing a current out-of-phase with respect to the mains voltage (reactive power compensation) or by adding current or current pulse harmonics to improve the shape of the mains voltage/compensate mains disturbances;

and/or individually managing each element of the system (cell or group of cells) and each element may be either connected in series with the other elements of the battery pack, or short-circuited (no current no longer flows through the cell or the cells of the element), either set in series, with an opposite polarity, with the other elements, or still possibly set in parallel with one or more other element(s);

and/or generating, at the output of the battery, a fixed voltage or a variable voltage (for example sinusoidal), with a step equal to the voltage of one element, by connecting, one after another, the elements directly to the output of the system. Indeed, such a system can make the number of elements connected in series, among the available elements, dynamically evolve;

and/or, in the presence for example of a smoothing inductance and/or via parasitic inductances, regulating the output voltage so as to follow any setpoint voltage, for example sinusoidal.

In the context of the present text, an "element" may include one cell or a group of elementary cells which may be set in series and/or in parallel (forming a module); the step of the voltage supplied by one element may be for example in the range of 3.6V, 12V or 24V, 48V or any other value.

As indicated hereinabove, each cell can be set in series or in parallel with other cells of the same module and/or replaced by a short-circuit. To this end, power switches, for example transistors, are provided. In this example, like the other examples or embodiments of the present application, the power switches may be made using power transistors, preferably of the NMOS type, or bipolar, or FET, or JFET, or IGBT transistors.

The power switches thus implemented allow using, or not, some cells and/or some modules of cells depending on needs and/or achieving an optimisation of the use of the battery pack.

In the illustrated example, each cell is provided (only some power switches associated with the cell 121 are numbered in FIG. 1):

with a cell power switch 121$_t$ to connect or disconnect this cell of the battery; it is possible to have several cells in parallel with each cell that has its power switch in series; in this case, a cell can be disconnected and the main current continues flowing throughout the remaining cells in parallel; and/or it is possible, like in FR2977986, to toggle or flip cells from a series configuration into a parallel configuration and vice versa, and/or exclude the cell;

with a parallel power switch 121$_p$ to replace this cell, or not, by a short-circuit with respect to the main current that circulates in the power route between the terminals 101 and 102 of the battery pack.

The battery pack and/or each cell, or one or more cell(s), may be provided with one or more temperature sensor(s); possibly one or more cell(s) may be provided with a sensor for measuring charging of the cell and/or with a sensor for measuring the voltage at the terminals of the cell and/or with a sensor for measuring the mechanical deformation of the cell and/or with a sensor for measuring gas in the cell (for example to detect an overcharging, or an overheat or a leak that might cause the generation of gases) and/or with an acoustic sensor (either to detect a chemical reaction in the cell, or else, if it consists of an ultrasonic-type sensor, to characterise the cell, similarly to the sonography principle or in the form of a characterisation of an acoustic channel) and/or a chemical sensor, for example to measure the density of free ions Li or others in the element.

The device may include a control circuit or a controller 30 which allows, in particular, controlling opening and closure of the power switches of the different cells. The signals that originate from the sensor(s) can be transmitted to this control circuit.

More accurately, as illustrated in FIG. 2, the control circuit 30 may include:

a processor or microprocessor or microcontroller or FPGA ("Field Programmable Gate Arrays") or ASIC ("Application-Specific Integrated Circuit") 300 specifically adapted to, or programmed to, implement a method according to the invention;

means, or a circuit, 301 for receiving temperature measurement signals Sim of one or more sensor(s) associated with one or more element(s) of the battery pack and to supply these signals to the processor or microprocessor 300; the latter can compare one or more temperature(s) thus measured with one or more setpoint temperature(s) and/or can compare temperatures of different cells or of different elements with each other;

means, or a circuit, 302 for controlling the open or closed state of the different power switches associated with the different cells of the battery pack and/or for controlling the open or closed state of the different power switches of the different H-bridges (cf. hereinbelow), on instructions from the processor or from the microprocessor;

means, or a circuit, 303 for controlling the open or closed state of the power switch 20 of FIG. 1, on instructions from the processor or from the microprocessor.

Specific electronics (not represented in the figures) may be associated to each module 12, 14, 16. In this case, the control unit 30 can advantageously communicate with each specific piece of electronics of each module, for example via a communication bus, still for example a common and galvanically-isolated bus. For example, the control circuit 30 can:

send to the specific electronics of each module the position that the power switches, whether the cell power switches and/or the power switches of the H-bridge (cf. hereinbelow) of the module, should take on within the module;

and/or possibly received from the modules information that have been measured locally by the electronics of each specific electronics;

and/or possibly access (receive or read) more general measurements, for example the voltage of the battery pack and/or the current that flow through the battery pack. These general measurements are made by measuring means (sensors), for example associated to the control unit without passing through the electronics of the modules. Similarly, the control of the power switch 20 could be done without passing through the electronics of the modules, but through an electronic interface between the control circuit 30 and the power switch 20.

According to a particular embodiment, the means (or circuits) 302 and 303 and/or 301 may be integrated within the same unit.

A control circuit of the means 20 can be separate from, or possibly be associated with a general measuring circuit (one could notice that the output current measurement can be useful for the regulation of the current).

Each module may also include a H-bridge 13, 15, 17 placed between the 1$^{st}$ terminal and the 2$^{nd}$ terminal of the module, which allows reversing, or not, the polarity of all elements connected to the bridge; in one variant, not represented in the figures, it is possible to implement a controlled switch or a controlled changeover switch, for example an electromechanical relay which serves as a changeover switch (next, only the variant implementing H-bridges will be described, but the invention could also be adapted to the case of changeover switches). This bridge includes the power switch means 13$_{i1}$, 13$_{i2}$, 13'$_{i1}$, 13'$_{i2}$ . . . (only the power switches of the H-bridge 13 associated with the module 12 are numbered in FIG. 1) allowing setting a module in series with the next module and/or connecting the module to a $1^{st}$ terminal (which could be arbitrarily described as the input terminal) 101 or a $2^{nd}$ terminal (which could be arbitrarily described as the output terminal) 102 of the pack. In each branch of the H-bridge, a point between the power switches of this branch can be connected to a point between the power switches of a branch of a H-bridge of a neighbouring module or of the $1^{st}$ terminal 101 or of the $2^{nd}$ terminal 102 of the entire system.

Each module 12, 14, 16 of the example of FIG. 1 can connect to the output 1, 2, 3 or 4 elements in series, in both polarity ways. More generally, for M modules, each module i ($1 \leq i \leq M$) including $N_i$ cells ($1 \leq N_i$), each module may connect to its output 1, 2 . . . or $N_i$ elements in series, in both polarity ways.

Since each module is independent, its H-bridge can be oriented in any manner with respect to that of the other modules.

Means 20 allow achieving a short-circuit between the input terminal 101 and the output terminal 102 of the pack; these means 20 include for example a power switch, for example a transistor of the type mentioned hereinabove, disposed between this input and this output. For example, these means 20 are controlled by the control means 30 or by an electromechanical relay. One could notice that, alternatively, a manual control is possible, although this is less interesting because it is less certain, it can be associated with a locking mechanism to prevent an actuation at the wrong time.

An example of a balancing method according to the invention, implementing a short-circuit mode using the means 20; is as follows:

the means 20 are closed;

a temperature setpoint of one or more element(s) (cells or modules) is determined;

then one or more element(s) to be heated up are selected;

the elements are preferably heated up in pair(s); if one single element is to be heated up, it can successively exchange with all other elements and therefore be heated up with an average power that is much higher than for the others (itself being all the time exchanging current while the others are subjected to the exchanged current only during a short period of time); the control device 30 controls the power switches of the cells, of the modules and/or of the H-bridges to make a current circulate from one or more of this/these element(s) to one or more other one(s) of these elements; in other words, a current is regulated between these elements and charges are therefore transferred from one or more of this/these element(s) to one or more other one(s) of this/these element(s);

for example this current can circulate as long as the element or the elements that is/are being heated has/have not reached a predetermined temperature level, or the same temperature level as one or more other element(s).

The temperature of the element or of the elements can be measured and compared with a setpoint temperature.

Hence, the invention allows proceeding with heating of one or more element(s), for example one or more cell(s) or else one or more module(s).

Yet, alternatively to heating one or more element(s), or complementarily, it allows guaranteeing a minimum temperature on each element (ex: T>0° C.);

and/or balancing the temperatures of 2 or more elements;

and/or maintaining, over a portion of the battery, a minimum temperature (for example to guarantee a minimum service during use, for example a start-up: heat-up of the rest of the battery, maintenance of safety functions (for examples headlamps or stop lamps of a motor vehicle . . . )

and/or make the temperature of the battery, or of a portion of the latter, rise before use thereof, for example before start-up of a vehicle.

Herein again, the temperature can be measured and compared with a setpoint temperature that should be reached. Or, when it is desired to balance the temperatures of 2 or more elements, the temperatures of these elements can be measured and compared.

According to an embodiment of the invention, based on the information relating to all of the cells or of the modules to be heated up, the mean 30 can perform a distribution of these cells or modules into two groups G1 and G2, for example substantially equivalent in terms of needs for heat-up (this need being for example expressed in overall thermal Wh).

Afterwards, it is possible to proceed with a regulation of an exchange current between the groups G1 and G2 allowing for example following a setpoint current, which can be preprogrammed or calculated for example according to the properties of the bricks (or elements) (for example according to a capacity to accept a current and/or a "C-rate" limit and/or the current state of one or more element(s) or cell(s) (for example the temperature and/or the state-of-charge and/or the state-of-health).

One could notice that:

the "C-rate" is a current value in Amps brought to the capacity of the cell in Amps-hours; thus, a 5 A current drawn in a 10 Ah cell, corresponds to a C-rate of 0.5. It consists substantially of a charging or discharge rate (but the current at the discharge end or charging end is limited, which prevents preserving the value of the C-rate until the end): for example, a C-rate of 1 corresponds to a complete charging or discharge in 1 h, a C-rate of 2 corresponds to a complete charging or discharge in 30 minutes;

the state-of-charge can be estimated by an estimation algorithm, for example based on a measurement of the voltage of the cell, advantageously completed by a temperature measurement and also advantageously completed by a current measurement; to this end, there are more or less sophisticated algorithms, for example disclosed in the article: M. A. Hannan, M. S. H. Lipu, A. Hussain, A. Mohamed, "A review of lithium-ion battery state of charge estimation and management system in electric vehicle applications: Challenges and recommendations», Renewable and Sustainable Energy Reviews, Volume 78, 2017, Pages 834-854, ISSN 1364-0321, https://doi.org/10.1016/j.rser.2017.05.001;

to measure the state-of-health, it can measure the number of Amps-hours that the cell can store; for this purpose, a complete discharge-charging or charging-discharge is done and the number of Amps-hours is counted to switch from a completely discharged state to a completely charged state or vice versa. There are algorithms, more or less sophisticated, to avoid making this state-of-charge full swing. According to one example, it is possible to measure a number of Amps-hours that separates two states-of-charge, for example estimated via the methods described before and, by extrapolation, deduce the total number of Amps-hours therefrom.

Preferably, the regulation is performed while maximising the number of elements involved in the groups G1 and G2: the smallest group substantially determines the number of elements that can be used in the largest group. Hence, the maximum number of elements involved is substantially twice the number of elements of the smallest group; maximising the use of the elements of the smallest group amounts to maximising the total number of elements involved. Preferably, we have 2 identical or relatively similar groups in terms of number of elements and heat-up need. Thus, if the two groups are identical or similar, the current is not more limited by one group than by the other one and likewise for the number of elements. A maximisation of this number of elements in each of the groups can be carried out as follows.

The group G1 supplies a first voltage $U_{G1}$ and the group G2 supplies a second voltage $U_{G2}$ with a reverse polarity (with polarity reversal means, for example the above-described H-bridges in FIG. 1).

Figure 8:
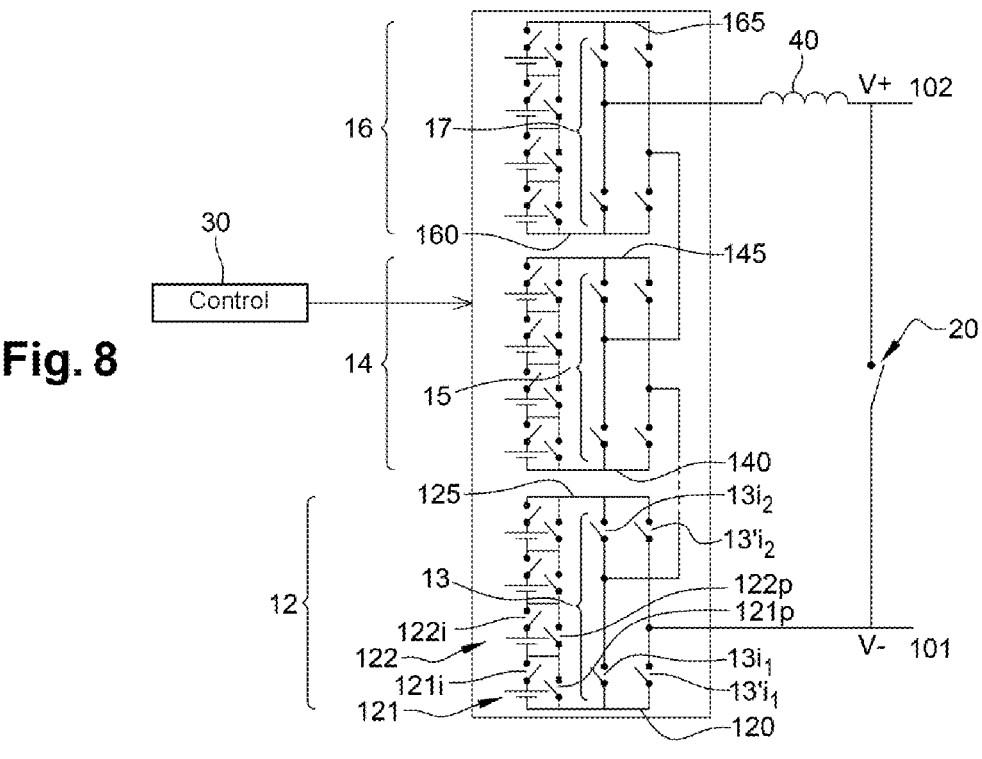
FIG. 8 represents a variant of the device of FIG. 1, with an output inductance.
Figure 9:
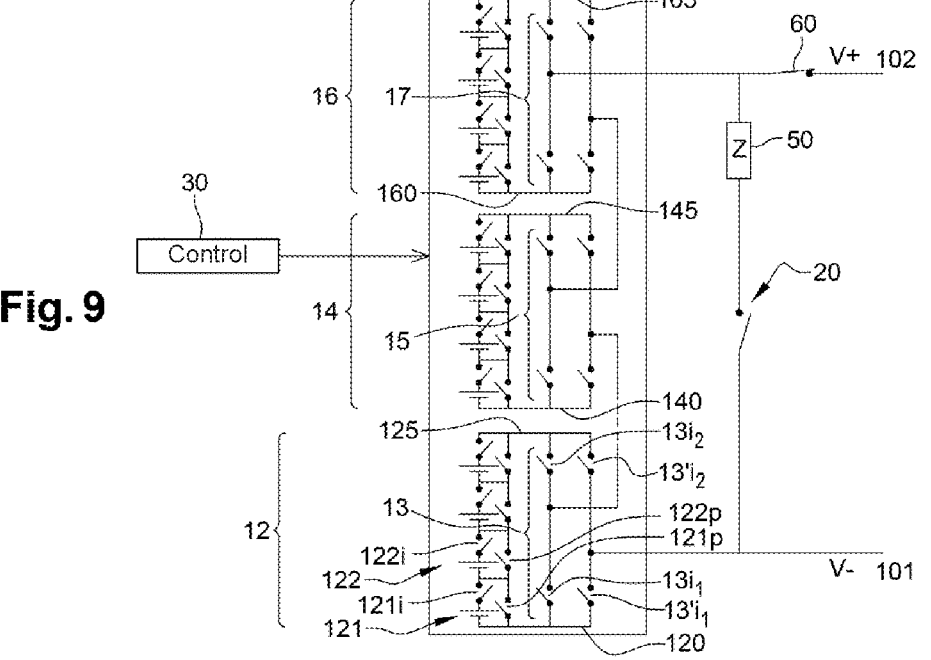
FIG. 9 represents still another variant of a device according to the invention, with several power switches allowing short-circuiting its output.

The current evolves substantially according to $i=(U_{G1}+U_{G2})/(L*t)$ if losses are neglected, L representing the inductance placed at the output, for example like in FIG. 8, or still for example the imaginary component of the complex impedance Z of FIG. 9. In some cases, the self-impedance of the cables and of the cells can be enough to filter the current (for example if the drive frequency is high enough with regards to the length of wiring).

The current actually depends on the discrepancy $\Delta U=U_{G1}-(-U_{G2})$, the current regulation loop acting on this $\Delta U$ to regulate the exchanged current.

The same $\Delta U$ can be obtained for different values of $U_{G1}$ and of $U_{G2}$ and it is possible to obtain the desired value of $\Delta U$ by a regulation loop with the pair $(U_{G1}, U_{G2})$ that maximises $|U_{G1}|+|U_{G2}|$. This corresponds to the maximisation of the number of cells involved in the exchanges: for the same exchanged current, if the voltage is maximised, the number of connected elements is maximised and therefore the number of heated elements.

To obtain this maximisation, it is known that $U_{G1}=-U_{G2}+\Delta U$ or $U_{G2}=-U_{G1}+\Delta U$. For example, $U_{G2}$ is set at its minimum value $U_{G2min}$ and $U_{G1}$calculated$=-U_{G2min}+\Delta U$ is calculated:

if $U_{G1}$calculated is lower than $U_{G1max}$, these values are kept;

if $U_{G1}$calculated is higher than $U_{G1max}$, then $U_{G1}$ is set at its maximum value $U_{G1max}$ and $U_{G2}$calculated$=-U_{G1max}+\Delta U$ is calculated.

It is also possible to set a reversed voltage polarity. In this case, $U_{G2}$ is set at its maximum value $U_{G2max}$ and $U_{G1calculé}=-U_{G2max}+\Delta U$ is calculated:

if $U_{G1}$calculated is higher than $U_{G1min}$, these values are kept;

if $U_{G1}$calculated is lower than $U_{G1min}$, then $U_{G1}$ is set at its minimum value $U_{G1min}$ and $U_{G2}$calculated$=-U_{G1min}+\Delta U$ is calculated.

Thus, a maximum value and a minimum value of the voltage are defined during the current exchange; afterwards, it is possible to take on the maximum voltage, or the minimum voltage or else alternate between the maximum voltage and the minimum voltage, for example according to a square-like signal. Alternatively, it is possible to adopt any waveform for the voltage, for example a sinusoidal form whose swing varies from the minimum voltage to the maximum voltage thus calculated.

Alternatively, the operation may be as follows (without seeking to maximise the amplitude of the voltages $U_{G1}$ et $U_{G2}$ and/or the number of elements involved among the groups G1 and G2): for example an amplitude lower than $Min(U_{G1max}, U_{G2max})$, for example ½ $Min(U_{G1max}, U_{G2max})$ or else: is defined, $$Min(U_{G1max},U_{G2max})-Marge,$$

the "Margin" may, for example, be enough so that the current regulation loop, which adjusts the voltage around this target value, does not reach the voltage limit too often, which might make it unstable.

Hence, an algorithm or a method implemented according to the invention may include the following steps, each of which has been described in details hereinabove:

step 1: determination of the temperature setpoints;

step 2: selection of the elements to be heated up then distribution into 2 groups G1 and G2, possibly with maximisation of the number of elements in each of the groups (or, as already explained hereinabove, we tend, or we look to tend, to heave 2 identical or similar groups in terms of number of elements and heating need);

step 3: regulation of an exchange current between the two groups;

step 4: return to step 1.

The means 30 can:

proceed with the determination and the selection of steps 1 and 2, with possible maximisation;

switch the different switches of the system to make the exchange current circulate (step 3).

Consequently, the determination of the temperature(s) and/or of the current to circulate and/or the open and/or close strategy of the different switches of the battery pack, and/or these openings and/or closures of the different switches of the battery pack, can be carried out or determined by the means 30.

These means 30 can also stop temperature balancing, for example when a setpoint temperature is reached for all or part of the pack or else when several elements reach the same temperature, by opening the power switch 20.

Regardless of the strategy retained to define G1, G2 and/or the associated voltages, the heat-up is caused by the root mean square value of the current. Hence, it is possible to heat up the elements or the cells with an exchanged current that is zero on average.

Hence, this current can have any form, for example a periodic form that is zero on average (square-like or sinusoidal, or triangular) to which it is possible to superimpose a continuous component for example to ensure state-of-charge balancing between the bricks. Alternatively, the current may be constant and the voltages $U_{G1}$ et $U_{G2}$ are alternating and can possibly include a continuous component. Finally, it is possible to have both (voltage and current variables), with a periodic instantaneous power and possibly including a non-zero component to ensure balancing.

Balancing, for example charge balancing, of a battery pack according to the invention could also have been performed beforehand (for example upon stoppage of the vehicle), heating according to the invention being performed afterwards, for example at a currant that is almost zero on average for a heated cell and by performing current back-and-forth flows.

Charge balancing between the elements may be carried out, for example after an extended shutdown, for example in case of a non-homogeneous self-discharge effect or a relief effect leading to non-homogeneous relieved voltages. It is then possible to carry out balancing, with an average current relatively low compared to the nominal current. On the contrary, the currents exchanged back-and-forth to heat up according to the invention are significantly higher in amplitude (at least by a factor of 3). Heat-up related to the continuous component can be neglected most of the time, nonetheless it is possible to take it into account by reducing as much the AC component to reach the desired heat-up root mean square current.

Figure 3:
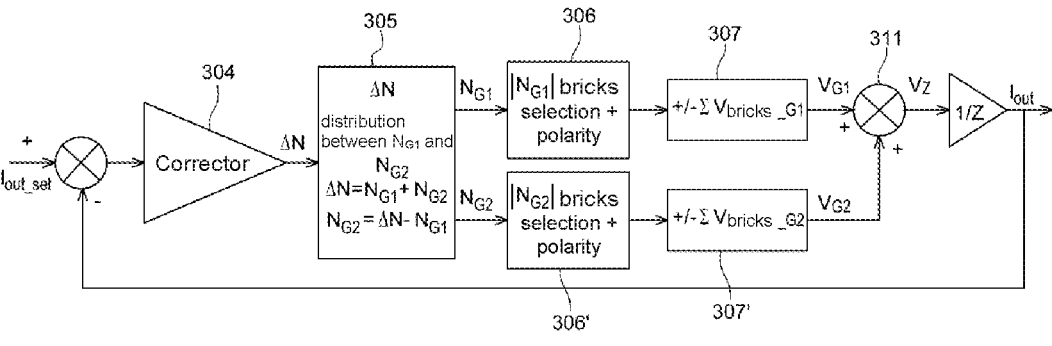
FIG. 3 represents a current regulation loop which can be implemented in the context of the invention.

FIG. 3 represents a current regulation loop which can be implemented in the context of the invention, for example by the means 30.

This regulation loop allows regulating the output current $I_{out}$ to make it follow a setpoint current $I_{out}$ set.

All control elements (left subtractor, 304, 305, 306, 306', etc.) of the regulation loop of FIG. 3 can be implemented by the same calculator, the same possibly applying to:

the functions of FIG. 4 (described hereinbelow);

and/or possibly the processing of the received data, and/or the preparation of the data or of the control frames to be sent to the modules.

The regulation loop, with the output of the pack short-circuited by the means 20, regulates the current $I_{out}$ that flows in these means 20 based on a setpoint current $I_{out\_set}$; $I_{out}$ also corresponds to the current that is exchanged between the groups G1 and G2. The discrepancy between $I_{out}$ and $I_{out\_set}$ is input in a regulator (corrector 304) which can be of any type, for example a PID (Proportional Integral Derivative) or integrating prediction ore reverse model mechanism. This corrector 304 determines the discrepancy, at all times, in the number N of bricks between the groups G1 and G2, the groups G1 and G2 having opposite polarities ($\Delta N = N_{G1} + N_{G2}$).

The block 305 "$\Delta N$ distribution", determines the number of bricks $|N_{G1}|$ to be used in the group G1 and the number $|N_{G2}|$ to be used in the group G2, and that being so while meeting the condition $N_{G1} + N_{G2} = \Delta N$. In other words, since there are several combinations ($N_{G1}$, $N_{G2}$) that can produce the same $\Delta N$, a selected or arbitrary function can be implemented, herein by the means 305. These means can retain or select a combination, from among the possible combinations, for example one that maximises the number of elements involved (selection criterion). More generally, it is possible to select different options:

maximisation of $|U_{G1}| + |U_{G2}|$;

or considering an amplitude slightly away from the maximum/minimum limits; for example an amplitude below Min(UG1$_{max}$, UG2$_{max}$, $-$UG1$_{min}$, $-$UG2$_{min}$);

or adjusting the amplitude according to the dispersal of temperature between the different elements (a lower amplitude inducing a selection of a more reduced number of elements and a more individual management; a higher amplitude inducing a selection of a larger number of elements that will be subjected to a more homogeneous current, especially if the waveform is a square or a continuous voltage).

or adjusting the voltage $U_{G1}$ and/or $U_{G2}$, according to the setpoint current; for example: when the setpoint current is high, only the cells that have the be heated the most could be connected and the more the current decreases, the larger the number of cells that could be connected will be.

or adjusting in real-time a proportion of connection time, for each cell of each group, according to the discrepancy, for each cell, with its target temperature. For example, this adjustment can be calculated via a regulation loop. For example, the cells that have need to be heated up the most are permanently connected and others, for which the need for heat-up is lesser, are connected only part of the time, for example x ms every second; this proportion depends for example on the discrepancy with a target/setpoint temperature. The cell that has the greatest temperature discrepancy with its target temperature is for example connected 100% of the time and the other cells are connected a % of the time, this a % being for example the ratio of the temperature discrepancy of the considered cell with its target temperature to the maximum temperature discrepancy of the cell connected 100% of the time. One also seeks to meet the $\Delta N$, and therefore achieving an adjustment in the degree of freedom enabled by NG1+NG2=$\Delta N$. The block 306 "$|N_{G1}|$ bricks selection+polarity" selects, in the group G1, $|N_{G1}|$ bricks to be connected and positions them according to the right polarity with regards to the sign of $N_{G1}$. This selection is performed with regards to an objective: temperature balancing and/or reaching a minimum temperature and/or raising the temperature of all or part of the pack. An element that needs to be heated up more than the other ones could be connected in priority. It is further possible to manage a priority list according to a discrepancy, for each element, between its temperature and a setpoint temperature that this element should desirably reach. The groups G1 and G2 can also be updated on a regular basis according to the evolution of the needs in terms of heat-up for all of the elements of the battery pack.

The block 306' "$|N_{G2}|$ bricks selection+polarity" has the same function, but for the group G2.

The block 307 "$+/-\Sigma \forall_{briques\_G1}$" represents the operation of the system, i.e. an estimation of the voltage $V_{G1}$ generated by all of the bricks of the group G1 selected and connected in series and including the polarity ($+/-$) of this connection, the elements of the group G1 being connected according to a polarity reversed with respect to the bricks of the group G2.

The block 307' "$+/-\Sigma \forall_{briques\_G2}$" has the same function but for the group G2.

The "adder" block 311, placed at the output of the previous 2 blocks, determines the voltage at the terminals of the impedance Z, this impedance Z representing the equivalent impedance of the battery pack completed by a possible complementary impedance placed on the feedback route at the output of the pack, for example an inductance. The impedance Z may be a complex impedance with a real part (resistive component of the impedance) and an imaginary part (inductive component of the impedance).

Figure 4:
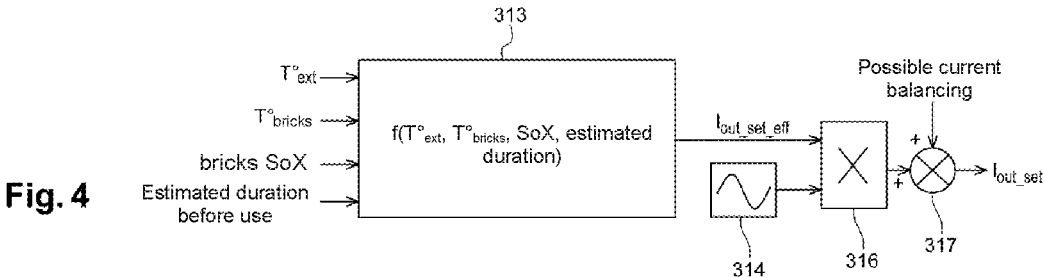
FIG. 4 represents an embodiment of means for determining a setpoint current in the context of the invention.

FIG. 4 represents an embodiment of means for determining a setpoint current $I_{out\_set}$ in the context of the invention.

As indicated hereinabove, heat-up of the different elements depends on the root mean square current that flows through the bricks (losses=$RI^2$, it should nevertheless be noted that the real component "R" of the impedance of the battery cells depends on the frequency, in which case "R" is considered with regards to the frequency of the current as seen by the cells).

The means 313 (for example a calculator (such as a microcontroller, or processor, or FPGA, or ASIC . . . ; these means being advantageously located in the means 30) determine the value/the profile of this root mean square current $I_{out\_set\_eff}$, for example, according to:

the heat-up need, related for example to the current temperature of the elements ("$T°_{éléments}$"); or to the external temperature "$T°_{ext}$" and/or to the state of the battery "Bricks SoX", for example to its state-of-charge (SoC) and/or state-of-health (SoH) (cf. hereinabove for reasons related to the estimation of these parameters);

and/or the capacity of the elements to accept a current: for example, at low temperature, at the charging end or else at the discharge end, it is possible that the elements tolerate such a high current only at another temperature, for example 25°, and at an intermediate state-of-charge; and/or the estimated duration ("time-to-use estimation") before the battery is used, if this data is known. In the case where it is the user who launches a pre-heating according to the invention, this duration could be known only at the last time and, preferably, it would then be possible to perform a quick pre-heating. Yet, it is also possible to implement a prediction algorithm, which allows knowing the pre-heating need in advance and in this case, the pre-heating program could define a setpoint current profile $I_{out\_set\_eff}$ that optimises both the energy consumed to pre-heat and the service life duration of the battery.

The "Normalised waveform" block 314 of FIG. 4 corresponds to the waveform that we wish to impart on the current, it may consist of a continuous value, or of a periodic wave, for example sinusoidal, square-like, triangular inter alia. For example, its amplitude is normalised so as to have a unit root mean square value.

Thus, by multiplying this waveform by the intermediate setpoint $I_{out\_set\_eff}$, a waveform that has a root mean square value corresponding to this setpoint is obtained.

The frequency of the waveform can be optimised to maximise heat-up, it is for example the frequency where the real component of the impedance of the cell is maximum, yet with frequency limits $f_{min}$ et $f_{max}$:

the limit $f_{min}$ may be such that the amount of energy exchanged over a half-period does not cause an excessive variation of the state-of-charge of the bricks ($f_{min}$ for example >0.01 Hz) and that being so in particular in the proximity of the charging or discharge end areas;

in turn, the limit $f_{max}$ may be limited by the maximum capacities of the device to generate a high-frequency waveform as well as by the losses that might occur in the electronic components that allow producing it (which losses increase with the increase of the switch frequency).

Finally, in the case of an alternating waveform, it is possible to add a continuous component to ensure a power transfer that is not zero on average, also allowing achieving balancing between the cells and/or the modules, for example a state-of-charge balancing.

Figure 5:
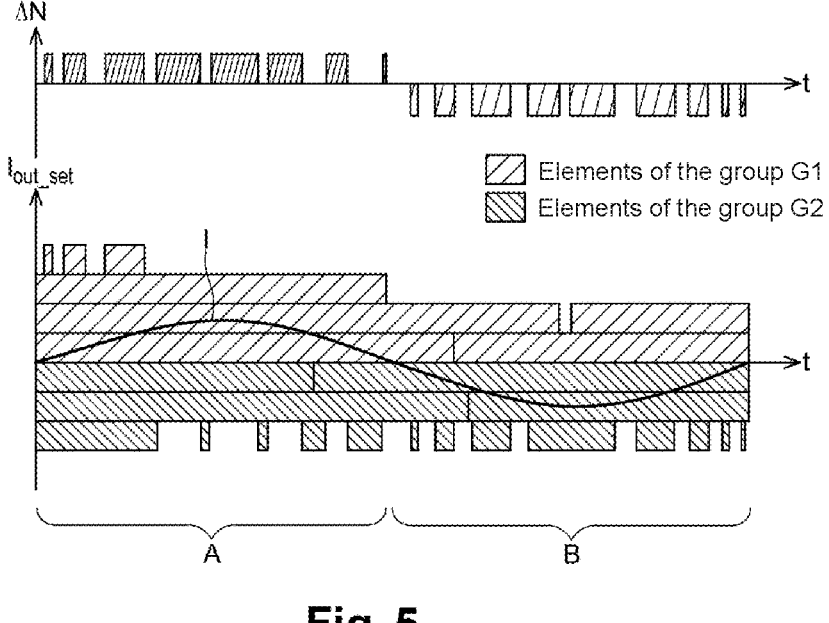
FIG. 5 represents an example of a time chart of the current and of the polarities of elements of the battery pack, which can be implemented in the context of the invention.

FIG. 5 represents an example of a time chart of the current and of the polarities of elements of the battery pack, which can be implemented in the context of the invention. In this example, the current wave I is sinusoidal and the polarity of the elements of each group (G1, G2) does not change over time. This is the case in particular of an example wherein, in a first portion A of the process, at least 4 elements should be heated in the group G1 and at least three elements should be heated in the group G2. In the second portion B of the process, only 2 elements are still to be heated in the group G1 and at least 3 elements in G2 (cf. in FIG. 5 the alternate presence of 2 and 3 elements of the group G2 below the time axis, in the portion B).

For example, the current is regulated in real-time by acting on $\Delta N$, then a pair ($N_{G1}$, $N_{G2}$) that selects at all times the bricks that should be heated up in priority while meeting the condition $N_{G1}+N_{G2}=\Delta N$ is determined.

If $N_{G1}$ has a positive polarity and $N_{G2}$ has a negative polarity: $\Delta N=N_{G1}-|N_{G2}.|$ More generally, $\Delta N$ corresponds to the difference of connected elements between the groups G1 and G2. In the example, the group G2 is connected according to a negative polarity and it is assumed that the voltages $V_{G1}$ et $V_{G2}$ are proportional respectively to $N_{G1}$ and $N_{G2}$. Therefore, it is herein assumed that the discrepancy $V_{G1}-|V_{G2}|$ is proportional to $\Delta N$. Moreover, it is considered that the impedance Z has a resistive behaviour which results in a positive $\Delta N$ inducing a positive current and a negative $\Delta N$ inducing a negative current. Moreover, the impedance Z has an inductive component which tends to smooth the current I.

Over the portion A, $N_{G1}$ is greater than $|N_{G2}|(\Delta N>0)$ which leads to a positive current I which follows a positive sine alternation. Over the portion B, $N_{G1}$ is smaller than $|N_{G2}|(\Delta N>0)$ which leads to a negative current I which follows a negative sine alternation.

In practice, $\Delta N$ operates substantially in the same manner as a PWM to induce a current that follows a setpoint current, herein sinusoidal.

Figure 6:
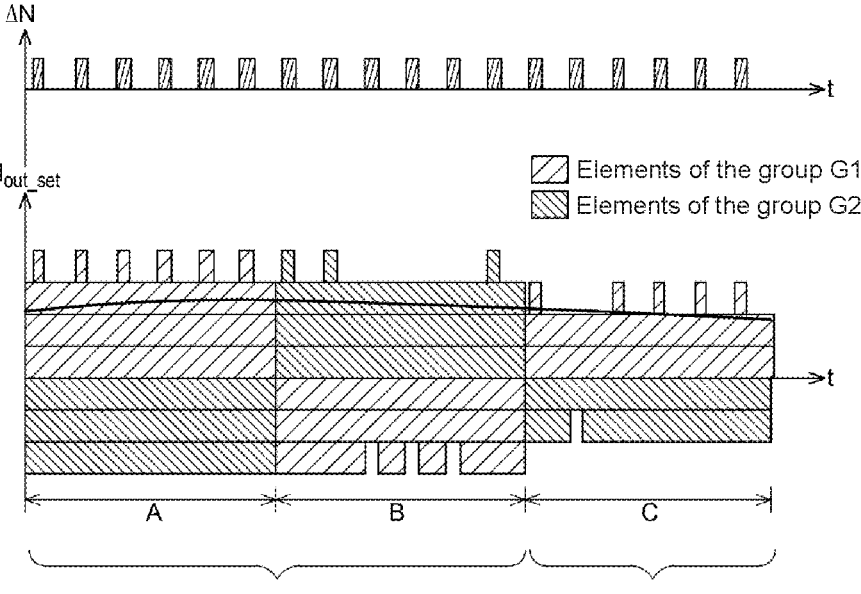
FIG. 6 represents another example of a time chart of the current and of the polarities of elements of the battery pack, which can be implemented in the context of the invention.

Alternatively, it is possible that the current setpoint $I_{out\_set}$ is not modulated by an alternating waveform, and instead, it is the polarity of the groups G1 and G2 which is modulated, as illustrated in FIG. 6. In this figure, the current is substantially constant and 3 heating phases A, B, C are distinguished, the polarity of each group G1, G2 changing from one phase to the next one.

In FIG. 6, in the same manner as before, $\Delta N=N_{G1}+N_{G2}$. In this FIG. 6:

over the phase A and over the phase C, $N_{G1}$ as a positive polarity and $N_{G2}$ has a negative polarity, consequently $\Delta N=N_{G1}-|N_{G2}|$;

over the phase B, $N_{G1}$ has a negative polarity and $N_{G2}$ has a positive polarity, consequently $\Delta N=-|N_{G1}|+N_{G2}$ Over the entire length of the profile, $\Delta N=N_{G1}+N_{G2}$ oscillates between 0 and 1, its moving average value is always positive resulting in a current I that is always positive yet with a slight variation because the positive pulses are slightly larger to the left than to the right inducing a moving average and therefore a current that is slightly higher to the left than to the right.

This is the case in particular of an example wherein at least 4 elements should be heated in each group G1 and G2 during the first two phases A, B; during the third phase C, only 2 elements are still to be heated in the group G2 (and 3 elements in G1).

Using an alternating current or an alternating voltage allows obtaining an exchanged power that is zero on average over time: $<U_{G1}*I_{out}>=<U_{G2}*I_{out}>\approx0$. At the period level, we have during one half-period, a power transfer in one way, then during the second half-period, a power transfer in the other way. The duration of one period is typically at least 100 times as short as the charging/discharge duration of the battery, so that the variation in the state-of-charge over a half-period remains low/negligible. At the charging/discharge end, this period can be reduced so as not to overcharge/undercharge.

Alternatively, or complementarily, the amplitude of the current can be reduced when approaching the charging/discharge end. In practice, for a reduced period for example to is, the exchanged amount of energy is extremely reduced compared to the energy that can be stored in the battery (the ratio (exchanged amount of energy)/(amount of energy that can be stored) is for example <1/1,000) for a 3 C current (3 C=3 times the capacity C of the cell in Ah, 1 Ah implying a current of 3×1 Ah=3 A).

It should be noted that, according to FIG. 6, the groups G1 and G2 can change polarity, for example on a regular basis, while the current $I_{out\_set}$ is substantially constant or changes slowly. One actually seeks to have the power P=U*I flowing back-and-forth, which can be obtained by alternating U or by alternating I (or both if this is not done at the same frequency or at a frequency multiple).

Figure 7A:
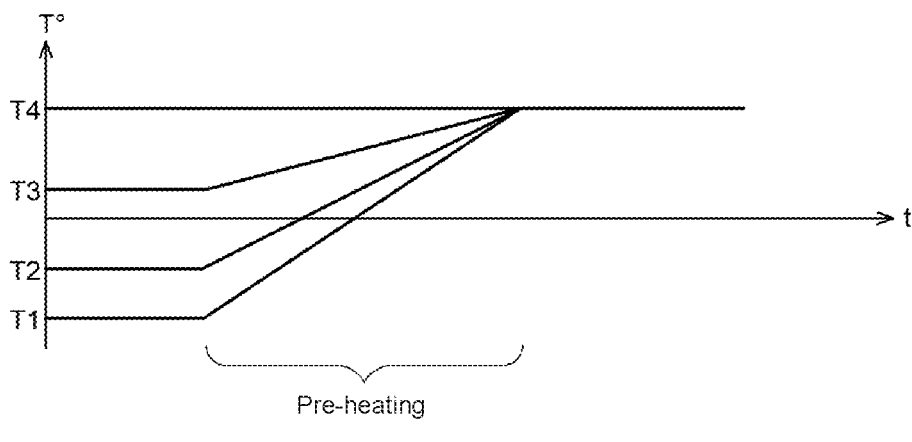
FIG. 7A, FIG. 7B, FIG. 7C, and FIG. 7D represent various examples of the evolution of temperature in a battery pack implementing the present invention.
Figure 7B:
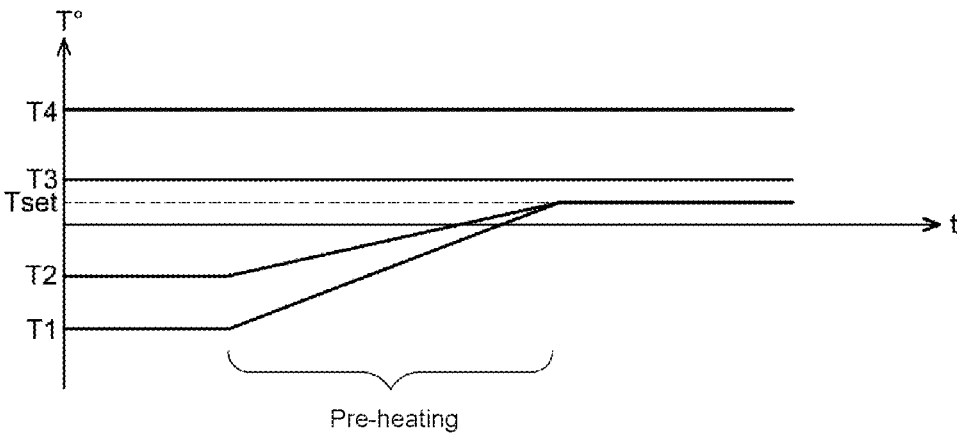
Figure 7C:
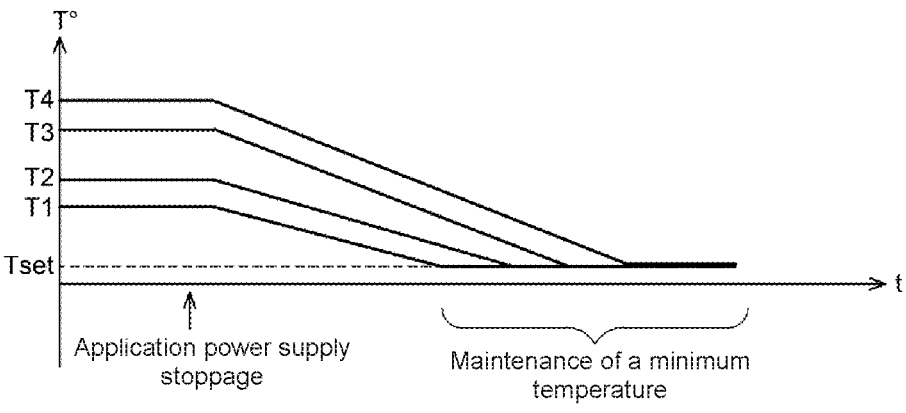
Figure 7D:
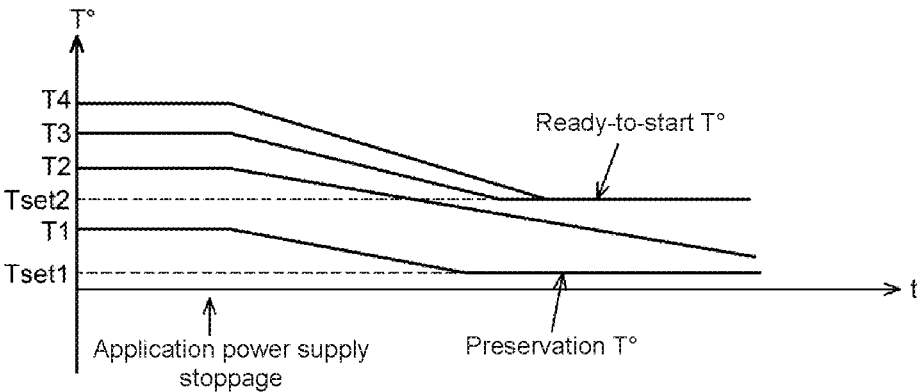

FIGS. 7A-7D represent various examples of evolution of the temperature in a battery pack implementing the present invention:

FIG. 7A represents the evolution of the temperatures of different elements in a battery pack, including a heating (or pre-heating) period according to the invention, in order to make the temperatures of the different elements converge towards the temperature of the hottest element;

FIG. 7B represents the evolution of the temperatures of different elements in a battery pack, including a heating (or pre-heating) period according to the invention, in order to reach, for the different elements that were at a temperature lower than Tset=T4, this minimum temperature Tset, which then becomes common to all elements;

FIG. 7C represents the evolution of the temperatures of different elements in a battery pack, in order to reach, for the different elements, a minimum temperature, which can then be maintained by a method according to the invention; bearing in mind the phase of lowering the temperature takes place without any intervention (the temperature drops on its own), the objective being herein to trigger a method according to the invention should the temperature of at least one cell tend to fall below Tset (minimum setpoint temperature) to keep the cell(s) at least at this temperature Tset. After a temperature drop phase (for example because the pack is in a vehicle parked in the cold, for example in high altitude in a ski resort), a method according to the invention can be implemented, for example according to a strategy according to one of FIGS. 7B and 7C, in order to obtain a device always ready to operate (in the case of a vehicle, it is always ready to leave) and/or in order to preserve the service life duration of the different elements; in the case of FIG. 7C, an additional heating phase, according to the invention, can be performed before start-up;

FIG. 7D represents the evolution of the temperatures of different elements in a battery pack, including a period of heating according to the invention, in order to maintain different minimum temperature for the different elements. According to an embodiment of the invention, the battery pack can be split into temperature subgroups.

For example, a portion of the battery is kept at a temperature $T_{set2}$, for example high enough to supply inrush currents should an application be turned on, and over another portion of the pack a minimum temperature $T_{set1}$ for preserving the battery is guaranteed. For example, this second portion of the battery may become fully available only after having powered the application for some time.

Still for example, in the case of FIG. 7D, to minimise the need for heating, the groups are formed based on the initial temperature of the elements: if 2 elements ready to start are needed, heating is activated when the temperature of at least one of the 2 cells with the highest temperature reaches Tset2, in order to keep it at Tset2. As regards the other ones, it is expected that their temperature reaches Tset1 to keep them at Tset1. The tendency of the temperature of the cells to decrease is typically related to a low external temperature.

Alternatively to the diagram of FIG. 7D, the temperature T3 could for example fall below Tset2 before T2 reaches Tset2, which could happen for example if the cell at T2 is at the centre of the pack while the cell at T3 is at the pack boundary and cools down more quickly by the effect of external cold.

All of the above-described methods can be implemented with the device described before in connection with FIG. 1.

Alternatively, illustrated in FIG. 8, a smoothing inductance 40, for example placed at the output of the battery pack, allows smoothing the current at the output of the latter. Still in one variant (not represented in the figures), an inductance may be distributed in the battery pack, for example at the output of each module or of each element. In this case, the power switch 20 is placed after the inductance 40, like in FIG. 8, in order to also benefit from this inductance during the regulation of the internal current of the battery pack when it is placed in the output short-circuit position.

A variant is illustrated in FIG. 9: if there is no inductance at the output of the battery pack, it is possible to add one (references 50 in FIG. 9) in series with the power switch 20, in order to smooth the current during balancing and also to better control it. This inductance will not be used during the normal operation of the pack. Alternatively, instead of the inductance, there could be one or more electronic component(s), whether active or passive, allowing limiting the current.

With such a component in series at the output of the system, the voltage between the positive pole and the negative pole will not be completely zero during balancing. A second power switch 60 may then be useful to avoid powering the equipment plugged to the battery pack with this residual voltage:

in normal operation, the power switch 20 is open and the power switch 60 is closed;

during the phase of heating by short-circuiting the output, the power switch 60 is open, and the power switch 20 is closed, either permanently or with a variable duty-cycle.

All of the methods described hereinabove can be implemented with the device that has just been described, whether in connection with FIG. 8 or with FIG. 9.

According to one example, the invention can be applied to heat a battery of a vehicle.

One could consider the example of an electric vehicle used in cold weather, for example in mountains in the winter. The vehicle is parked in the morning, the battery cools down during the day and, at the time of leaving, the battery is too cold to be used (for example the temperature is −30° C.). The elements located at the boundary of the battery pack have cooled down to a temperature lower than those of the centre of the battery. An alternating current is then exchanged between the elements, with a root mean square current that is even higher as the temperature of the considered brick is low. This mechanism then allows making the temperature of each of the elements of the battery rise to a setpoint temperature.

Alternatively, the elements of the battery are kept above a minimum temperature throughout the entire day, so as to increase their service lifespan and/or to make the battery available at any time.

The invention claimed is:

1. A battery pack device, comprising:
   a first terminal,
   a second terminal, and
   a plurality of energy storage elements between said first terminal and said second terminal, each energy storage element including:

at least one switch to connect the energy storage element with at least one other energy storage element, or to disconnect the energy storage element from at least one other energy storage element;

at least one conductor to conduct a main current, parallel to the energy storage element, when the energy storage element is disconnected or is not connected with the at least one other energy storage element;

at least one switch for establishing a short-circuit between a first terminal and a second terminal of the battery when the battery is disconnected or supplies a zero voltage; and a control circuit configured to:

select a first energy storage element and a second energy storage element, at least one of the first and second energy storage elements being to be heated up, to make a current circulate from the first element to at least the second element when the first terminal and the second terminal of the device are short-circuited; and stop the current (1) when at least one setpoint temperature for at least one or more of the energy storage elements of the battery pack and/or for a portion of the battery pack and/or for the battery pack is reached, and/or (2) when at least two of the energy storage elements have substantially a same temperature.

2. The device according to claim 1, wherein each energy storage element includes one or more electrochemical cells and/or one or more capacitance and/or one or more super-capacitances and/or one or more storage cells.

3. The device according to claim 1, wherein the control circuit is further configured to calculate at least one of a value and a profile of a heating current according to at least one of:

at least one of a temperature of one or more of the energy storage elements, an external temperature, a state of the battery, a state-of-charge of the battery, or a state-of-heath of the battery;

a capacity of the energy storage elements of the battery to accept a current; or a duration estimated before the battery is used.

4. The device according to claim 1, wherein the control circuit is further configured to calculate a heating current according to a waveform of the main current.

5. The device according to claim 1, wherein the main current has:

a continuous form or is constant;

a periodic waveform to which a continuous component is superimposed, allowing for a readjustment of a state-of-charge between the energy storage elements; or a continuous form or is constant and voltages supplied by the first energy storage element and by the second energy storage element are alternating.

6. The device according to claim 1, wherein the main current has a frequency for which a real component of an impedance of at least one of the energy storage elements is maximum.

7. The device according to claim 1, wherein the control circuit is further configured to:

perform a distribution of the energy storage elements to be heated up into two groups of elements; and make the main current circulate from a first group of the two groups of elements to a second group of the two groups of elements.

8. The device according to claim 7, wherein the control circuit is further configured to maximize $|U_{G1}|+|U_{G2}|$ with $U_{G1}$ being a voltage supplied by the first group and $U_{G2}$ being a voltage supplied by the second group.

9. The device according to claim 1, further comprising:

a current regulation loop determining a number of first energy storage elements, of the energy storage elements, and a number of second energy storage elements, of the energy storage elements, as well as a voltage supplied by all of the first energy storage elements and a voltage supplied by all of the second energy storage elements.

10. A method for heating a battery pack type device including a first terminal, a second terminal, and a plurality of energy storage elements between said first terminal and said second terminal, each associated with at least one switch to connect to or disconnect from one or more other of the energy storage elements, the method comprising:

establishing a short-circuit between the first terminal and the second terminal of the battery pack when the second terminal is disconnected or supplies a zero voltage;

selecting a first energy storage element, of the energy storage elements, and a second energy storage element of the energy storage elements, at least one of which is to be heated up;

circulating a current between the first element and the second element; and stopping the current (1) when at least one setpoint temperature for at least one or more of the energy storage elements of the battery pack, and/or for a portion of the battery pack and/or for the battery pack is reached, and/or (2) when at least two of the energy storage elements have substantially a same temperature.

11. The method according to claim 10, wherein at least one of a value and a profile of a heating current is set according to:

a temperature of one or more elements and/or an external temperature and/or a state of the battery;

a capacity of the energy storage elements of the battery to accept a current; or a duration estimated before the battery is used.

12. The method according to claim 10, wherein a heating current is calculated according to a waveform of the current.

13. The method according to claim 10, wherein current has a continuous form or is constant, or is a periodic waveform to which a continuous component is superimposed, allowing for a readjustment of a state-of-charge between first and second energy storage cells or the first and second storage elements, or the current is a continuous form or is constant, and voltages supplied by the first energy storage cell and by the second energy storage cell, being alternating, and including a continuous component.

14. The method according to claim 10, wherein the current:

has a frequency for which a real component of an impedance of at least one element is maximum, or is constant and a voltage supplied at least by the first element and/or a voltage supplied at least by the second element is alternating.

15. The method according to claim 10, wherein the circulating the current between the first element and the second element comprises a current back-and-forth flow between the first and second elements, the current exchanged between the first and second elements being zero on average.

16. The method according to claim 10, further comprising:

distributing the energy storage elements to be heated into two groups of elements, wherein the current is circulated from a first group of the energy storage elements to a second group of the energy storage elements.

17. The method according to claim 16, further comprising maximizing $|U_{G1}|+|U_{G2}|$ with $U_{G1}$ being a voltage supplied by the first group and $U_{G2}$ being a voltage supplied by the second group.

18. The method according to claim 10, wherein:

the current is regulated by a regulation loop; and the regulation loop determines a number of first energy storage elements, of the energy storage elements, and a number of second energy storage elements, of the energy storage elements, as well as a voltage supplied by all of the first energy storage elements and a voltage supplied by all of the second energy storage elements.

19. The method according to claim 10, further comprising at least one of:

heating different elements or different portions of the battery pack to different temperatures;

heating the different elements or different portions of the battery pack so as to make the different elements or portions converge towards a common temperature;

heating the different elements or different portions of the battery pack so as to make the different elements or portions converge towards a temperature of a hottest element or portion; or a preceding step of cooling the different elements or portions of the battery pack so as to make the different elements or portions converge towards a common temperature.

\*   \*   \*   \*   \*